United States Patent
Oh et al.

(10) Patent No.: US 10,184,524 B2
(45) Date of Patent: Jan. 22, 2019

(54) CONSTANT VELOCITY JOINT ASSEMBLY

(71) Applicant: Dana Automotive Systems Group, LLC, Maumee, OH (US)

(72) Inventors: Seung Tark Oh, Ann Arbor, MI (US); Dilson da Silveira Tavares, Porto Alegre (BR)

(73) Assignee: Dana Automotive Systems Group, LLC, Maumee, OH (US)

( * ) Notice: Subject to any disclaimer, the term of this patent is extended or adjusted under 35 U.S.C. 154(b) by 56 days.

(21) Appl. No.: 15/301,066

(22) PCT Filed: Mar. 30, 2015

(86) PCT No.: PCT/US2015/023295
§ 371 (c)(1),
(2) Date: Sep. 30, 2016

(87) PCT Pub. No.: WO2015/153431
PCT Pub. Date: Oct. 8, 2015

(65) Prior Publication Data
US 2017/0030415 A1 Feb. 2, 2017

Related U.S. Application Data

(60) Provisional application No. 61/975,130, filed on Apr. 4, 2014.

(51) Int. Cl.
*F16D 3/24* (2006.01)
*F16D 3/224* (2011.01)
*F16D 3/223* (2011.01)

(52) U.S. Cl.
CPC ............. *F16D 3/224* (2013.01); *F16D 3/223* (2013.01); *F16D 2003/2232* (2013.01);
(Continued)

(58) Field of Classification Search
CPC ................... F16D 3/224; F16D 3/223; F16D 2003/22313; F16D 2003/2232; Y10T 464/10; Y10S 464/906
(Continued)

(56) References Cited

U.S. PATENT DOCUMENTS 1,980,846 A 11/1934 Bradley
2,653,456 A 9/1953 Heym
(Continued)

FOREIGN PATENT DOCUMENTS

CN 1414257 A 4/2003
CN 102741578 A 10/2012
(Continued)

OTHER PUBLICATIONS

International Search Report and Written Opinion for Application No. PCT/US2015/023295, dated Oct. 15, 2015, issued by the European Patent Office.
(Continued)

*Primary Examiner* — Greg Binda
(74) *Attorney, Agent, or Firm* — Marshall & Melhorn, LLC (57) ABSTRACT

A constant velocity joint assembly (20) includes an outer race (22) having a plurality of outer tracks (42) formed in an inner surface thereof and an inner race having a plurality of inner tracks (54) formed in an outer surface thereof. A cage (26) is disposed between the inner race and the outer race. A plurality of torque transferring elements (28) are disposed in the cage. Each torque transferring element contacts one of the outer tracks of the plurality of outer tracks and one of the inner tracks of the plurality of inner tracks. A drive sleeve (30) is separated from the plurality of torque transferring elements by the inner race. Also, the drive sleeve is in driving engagement with the inner race. A stopper portion
(Continued)

(74) is attached to the drive sleeve. The stopper portion comprising a portion that reduces in thickness toward an outer end thereof.

16 Claims, 9 Drawing Sheets

(52) U.S. Cl.
CPC . *F16D 2003/22313* (2013.01); *Y10S 464/906* (2013.01); *Y10T 464/10* (2015.01)

(58) Field of Classification Search
USPC .................................. 464/17, 145, 182, 906
See application file for complete search history.

(56) References Cited

U.S. PATENT DOCUMENTS

| | | | |
|---|---|---|---|
| 3,162,024 | A | 12/1964 | Breuer et al. |
| 3,162,026 | A | 12/1964 | Ritsema |
| 3,176,476 | A | 4/1965 | Cull |
| 3,186,189 | A | 6/1965 | Cull |
| 3,452,558 | A | 7/1969 | Cull et al. |
| 3,464,232 | A | 9/1969 | Hutchinson |
| 3,540,232 | A | 11/1970 | Breuer |
| 3,789,624 | A | 2/1974 | Camosso |
| 3,802,221 | A | 4/1974 | Kimata |
| 3,858,412 | A * | 1/1975 | Fisher .................... F16D 3/227 464/906 |
| 4,034,576 | A | 7/1977 | Takahashi et al. |
| 4,112,709 | A | 9/1978 | Krude |
| 4,191,031 | A | 3/1980 | Girguis et al. |
| 4,205,925 | A | 6/1980 | Fisher |
| 4,229,952 | A | 10/1980 | Aucktor et al. |
| 4,319,467 | A | 3/1982 | Hegler et al. |
| 4,669,571 | A | 6/1987 | Krude |
| 4,877,103 | A | 10/1989 | Nuutio |
| 5,201,107 | A | 4/1993 | Mazziotti |
| 5,222,914 | A | 6/1993 | Mazziotti |
| 5,376,052 | A | 12/1994 | Jacob et al. |
| 5,580,313 | A | 12/1996 | Jacob et al. |
| 6,251,021 | B1 | 6/2001 | Jacob |
| 6,709,338 | B2 | 3/2004 | Weckerling et al. |
| 6,793,581 | B2 | 9/2004 | Meyer et al. |
| 6,988,949 | B2 | 1/2006 | Wang |
| 7,232,373 | B2 | 6/2007 | Hildebrandt et al. |
| 7,377,854 | B2 | 5/2008 | Wormsbaecher |
| 7,435,182 | B2 | 10/2008 | Ichikawa et al. |
| 7,607,984 | B2 | 10/2009 | Hopson et al. |
| 7,607,985 | B2 | 10/2009 | Krude et al. |
| 7,677,984 | B2 | 3/2010 | Hahn et al. |
| 7,704,149 | B2 | 4/2010 | Yamazaki et al. |
| 7,997,988 | B2 | 8/2011 | Wormsbaecher et al. |
| 8,033,920 | B1 | 10/2011 | Benson |
| 8,235,829 | B2 | 8/2012 | Kozlowski |
| 8,342,972 | B2 * | 1/2013 | Yamazaki ............. F16D 1/0864 464/906 |
| 8,371,949 | B2 | 2/2013 | Patterson et al. |
| 8,435,125 | B2 | 5/2013 | Ooba et al. |
| 8,469,829 | B2 | 6/2013 | Kobayashi et al. |
| 8,641,538 | B2 | 2/2014 | Oh |
| 9,133,888 | B2 | 9/2015 | Gremmelmaier et al. |
| 9,670,963 | B2 * | 6/2017 | Metzger .................. F16D 3/845 |
| 2001/0046901 | A1 | 11/2001 | Meyer et al. |
| 2003/0083135 | A1 | 5/2003 | Yamazaki et al. |
| 2012/0004044 | A1 * | 1/2012 | Conger .................. F16D 1/116 |
| 2016/0017929 | A1 * | 1/2016 | Sugiyama ............. B60K 17/22 |

FOREIGN PATENT DOCUMENTS

| | | |
|---|---|---|
| DE | 2703467 A1 | 8/1978 |
| DE | 2801114 B1 | 6/1979 |
| DE | 102010031841 A1 | 3/2012 |
| FR | 2899660 A1 | 10/2007 |
| GB | 2017256 A | 10/1979 |
| NL | 301618 A | 10/1965 |

OTHER PUBLICATIONS

The State Intellectual Property Office of the People's Republic of China, Chinese Search Report for Application No. 201580025387.9.

* cited by examiner

CONSTANT VELOCITY JOINT ASSEMBLY

CROSS-REFERENCE TO RELATED APPLICATION

This application is claiming the benefit, under 35 U.S.C. 119(e), of the provisional application which was granted Ser. No. 61/975,130 and filed on Apr. 4, 2014, the entire disclosure of which is hereby incorporated by reference.

BACKGROUND OF THE INVENTION

The invention relates to a constant velocity joint assembly which facilitates venting pressurized gases in the assembly to the atmosphere. More specifically, the invention relates to a direct pinion mount constant velocity joint assembly which facilitates venting pressurized gases in the assembly to the atmosphere and prevents damage to the assembly by limiting the maximum articulation angle.

Constant velocity joint assemblies are known. However, the assemblies known in the art do not provide robust venting. Furthermore, the assemblies known in the art can be damaged when the assembly is taken beyond its maximum articulation angle. Therefore, it is desired to provide an improved assembly which vents effectively and protects the constant velocity joint from damage.

BRIEF SUMMARY OF THE INVENTION

Embodiments of a constant velocity joint assembly are provided.

In an embodiment, the constant velocity joint assembly comprises an outer race having a plurality of outer tracks formed in an inner surface thereof and an inner race having a plurality of inner tracks formed in an outer surface thereof. A cage is disposed between the inner race and the outer race. A plurality of torque transferring elements are disposed in the cage. Each torque transferring element contacts one of the outer tracks of the plurality of outer tracks and one of the inner tracks of the plurality of inner tracks. A drive sleeve is separated from the plurality of torque transferring elements by the inner race. Also, the drive sleeve is in driving engagement with the inner race. A stopper portion is attached to the drive sleeve. The stopper portion comprises a portion that reduces in thickness toward an outer end thereof.

In another embodiment, the constant velocity joint assembly comprises an outer race having a plurality of outer tracks formed in an inner surface thereof and an inner race having a plurality of inner tracks formed in an outer surface thereof. A cage is disposed between the inner race and the outer race. A plurality of torque transferring elements are disposed in the cage. Each torque transferring element contacts one of the outer tracks of the plurality of outer tracks and one of the inner tracks of the plurality of inner tracks. A drive sleeve is separated from the plurality of torque transferring elements by the inner race. Also, the drive sleeve is in driving engagement with the inner race. A stopper portion is attached to the drive sleeve. The stopper portion has a portion that gradually reduces in thickness toward an outer end thereof. Also, the stopper portion has an outer portion that comprises an outer diameter which is substantially constant and extends into a space defined by the outer race.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments may be commonly referred to with like reference numerals within this section of the application.

A constant velocity joint assembly 20, 20A, 20B, 20C, 20D will be described herein. The constant velocity joint assembly 20, 20A, 20B, 20C, 20D will be described in connection with a vehicle (not depicted). However, it would be understood by one of ordinary skill in the art that the present invention could The constant velocity joint assembly 20, 20A, 20B, 20C, 20D may have applications to on-highway and off-highway vehicles. Further, the assembly 20, 20A, 20B, 20C, 20D can be utilized with an all-wheel drive vehicle. Also, it should be appreciated that the assembly 20, 20A, 20B, 20C, 20D could be utilized with a rear wheel drive vehicle or a front wheel drive vehicle.

Referring now to the drawings, there is illustrated in FIGS. 1, 5, 6, 8 and 10 embodiments of a constant velocity joint assembly 20, 20A, 20B, 20C, 20D in accordance with the invention. The constant velocity joint assembly 20, 20A, 20B, 20C, 20D includes an outer race 22, an inner race 24, a cage 26, a plurality of torque transferring elements 28, a drive sleeve 30, a drive nut 32, and a boot assembly 34. A plug-in pinion shaft 36 is drivingly engaged with the drive sleeve 30, and the drive sleeve 30 is drivingly engaged with the inner race 24. Preferably, the outer race 22, inner race 24, drive sleeve 30, drive nut 32, boot assembly 34 and plug-in pinion shaft 36 are aligned with a longitudinal axis 38 of the assembly 20, 20A, 20B, 20C, 20D. The constant velocity joint assembly 20, 20A, 20B, 20C, 20D may be of the Rzeppa variety. However, it should be understood that the constant velocity joint assembly may be any other type or variety of constant velocity joint.

The outer race 22 is a hollow cylindrical body formed from a rigid material such as steel. The outer race 22 is typically forged and then machined in a secondary operation. However, it should be understood that the outer race 22 may be formed using other processes and from any sufficiently rigid material. An attachment end 40 is formed in the outer race 22, and is drivingly engaged with a shaft (not shown). Alternately, it is understood that the attachment end 40 may be coupled to any other type of member.

A plurality of outer tracks 42 are formed in an inner surface 44 of the outer race 22. Each of the outer tracks 42 has an arcuate profile which follows an arcuate path, the arcuate path having a center point different from a center point of the constant velocity joint assembly 20, 20A, 20B, 20C, 20D. Preferably, the outer race 22 includes six outer tracks 42 formed therein. However, it is understood that each of the outer tracks 42 may have a non-arcuate profile and any number of the outer tracks 42 may be formed in the outer race 22. The plurality of outer tracks 42 is equally spaced about the axis of the outer race 22.

The inner surface 44 is a spherical surface of the outer race 22 having a center point common with the center point of the constant velocity joint assembly 20, 20A, 20B, 20C, 20D. A radius of the inner surface 44 is complementary to an outer surface 46 of the cage 26. The plurality of outer tracks 42 and the inner surface 44 are precision machined for use as surfaces of a constant velocity joint assembly as is known in the art.

The inner race 24 is a hollow member formed from a rigid material such as steel. It is understood that the inner race 24 may be formed using any conventional process from any rigid material. When the drive sleeve 30 is drivingly engaged with the inner race 24, the inner race 24 is typically splinigly disposed on an end portion of the drive sleeve 30.

The inner race 24 includes an inner race outer surface 60 and an inner race inner surface 62. The inner race outer surface 60 is a spherical surface of the inner race 24 having a center point common with the center point of the constant velocity joint assembly 20, 20A, 20B, 20C, 20D. The inner race inner surface 62 defines a cylindrical bore through the inner race 24. A plurality of splines 52 are formed on the inner race inner surface 62 for drivingly engaging the inner race 24 with the drive sleeve 30.

Figure 1:
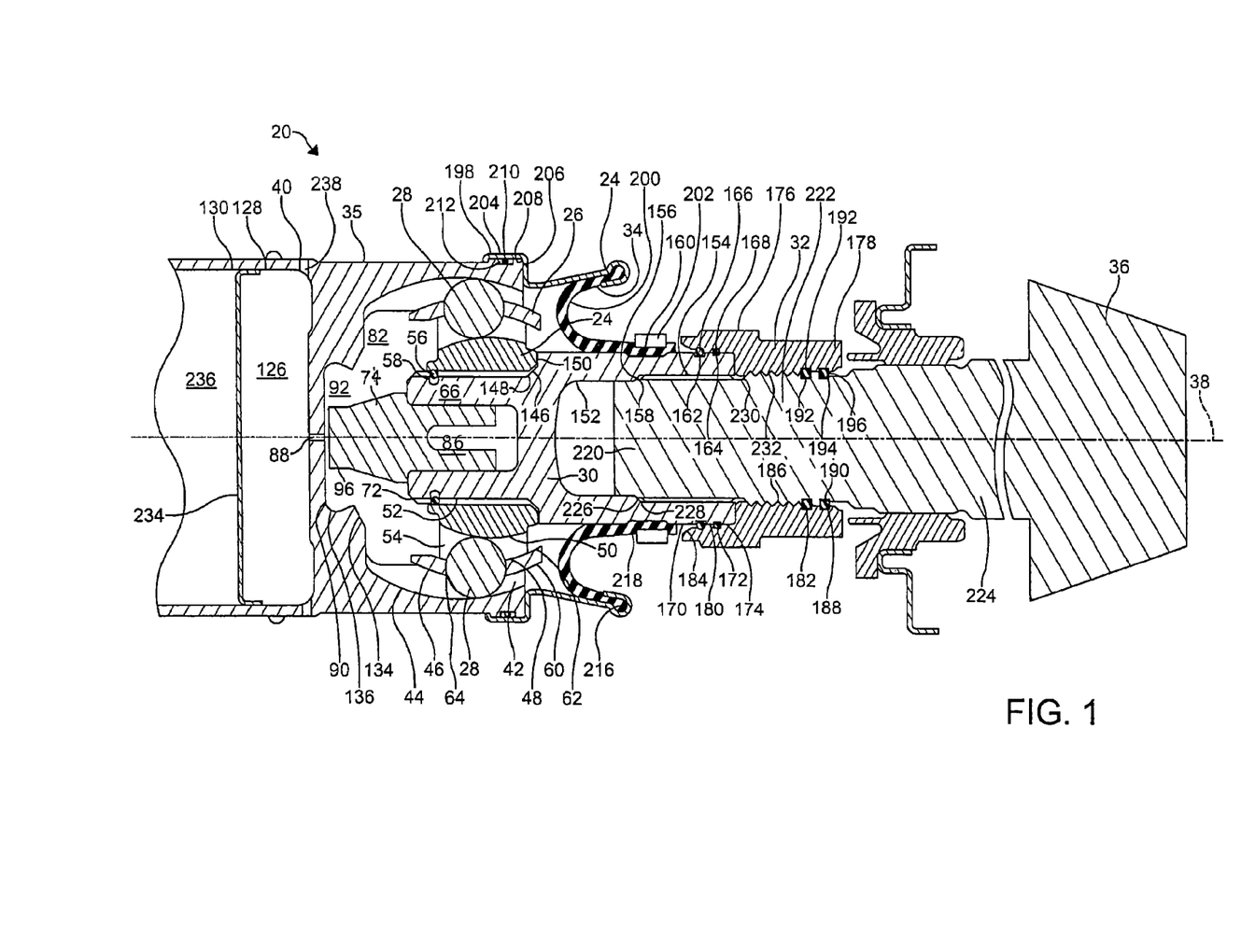
FIG. 1 is a cross-sectional view depicting an embodiment of the assembly in accordance with the invention.

A plurality of inner tracks 54 are formed in the inner race outer surface 60. Each of the inner tracks 54 has an arcuate profile which follows an arcuate path, the arcuate path having a center point different from a center point of the constant velocity joint assembly 20, 20A, 20B, 20C, 20D. The diameter of the arcuate profile of each of the inner tracks 54 is complementary to the diameter of the arcuate profile of each of the outer tracks 42 corresponding thereto. As shown in FIG. 1, a depth of each of the inner tracks 54 varies depending on a distance the inner race outer surface 60 is from the axis of the inner race 24. Preferably, the inner race 24 includes six inner tracks 54 formed therein. However, it is understood that each of the inner tracks 54 may have a non-arcuate profile and any number of the inner tracks 54 may be formed in the inner race 24. The plurality of inner tracks 54 is equally spaced about the axis of the inner race 24.

The inner race 24 is secured to the drive sleeve 30 using a snap ring 56 disposed in a groove 58 formed in an outer surface of the drive sleeve 30. Alternately, any other type of fastener may be used to secure the inner race 24 to the drive sleeve 30.

The cage 26 is disposed between the outer race 22 and the inner race 24. The cage 26 is a hollow body machined from a rigid material such as steel. However, it is understood the cage 26 may be formed using other processes from any rigid material. The cage 26 includes a spherical outer surface 60 and a spherical inner surface 62. A plurality of perforations 64 is formed through the cage 26.

The spherical outer surface 60 has a center point common with the center point of the constant velocity joint assembly 20, 20A, 20B, 20C, 20D. The spherical outer surface 60 defines a portion of each of the perforations 64. The spherical outer surface 60 is disposed against and slidingly engages the inner surface 44 of the outer race 22. A diameter of the spherical outer surface 60 is complementary to the inner surface 44 of the outer race 22. The spherical outer surface 60 and the inner surface 44 are precision machined for use as mating surfaces of a constant velocity joint as is known in the art.

The spherical inner surface 62 has a center point common with the center point of the constant velocity joint assembly 20, 20A, 20B, 20C, 20D. The spherical inner surface 62 defines a portion of each of the perforations 64. The spherical inner surface 62 is disposed against and slidingly engages the inner race outer surface 60. A radius of the spherical inner surface 62 is complementary to a radius of the inner race outer surface 60. The spherical inner surface 62 and the inner race outer surface 60 are precision machined for use as mating surfaces of a constant velocity joint as is known in the art.

The plurality of torque transferring elements 28 comprises steel spheres disposed in each of the perforations 64, the outer tracks 42, and the inner tracks 54. Each of the torque transferring elements 28 is preferably a ball bearing as is known in the art. However, it is understood that the plurality of torque transferring elements 28 may be any other shape and formed from any other rigid material. A diameter of each of the torque transferring elements 28 is complementary to the diameter of the arcuate profiles of each of the outer tracks 42 and the inner tracks 54. The torque transferring elements 28, the outer tracks 42, and the inner tracks 54 are precision machined for use as mating surfaces of a constant velocity joint assembly as is known in the art. One torque transferring element of the plurality of the torque transferring elements 28 is disposed in and contacts one of the outer tracks 42 and one of the inner tracks 54. The torque transferring element is also in sliding engagement with the outer track 30 and the inner track 42 it is disposed in.

The drive sleeve 30 is an annular member formed from a rigid material such as steel. It is understood that the drive sleeve 30 may be formed using any conventional process from any rigid material. The drive sleeve 30 is disposed against and is in driving engagement with the inner race 24. The drive sleeve 30 comprises a first end portion 66, 66A, 66B, 66C, a middle portion 68, and a second end portion 70. The first end portion 66, 66A, 66B, 66C is drivingly engaged with the inner race 24, the middle portion 68 is disposed against the inner race 24, and the second end portion 70 is drivingly engaged with the plug-in pinion shaft 36.

The first end portion 66, 66A, 66B, 66C is a generally cylindrical shaped portion of the drive sleeve 30 spliningly engaged with the inner race 24. A plurality of splines 72 are formed in an outer surface of the first end portion 66, 66A, 66B, 66C. Alternately, it is understood that the drive sleeve 30 may be unitarily formed with the inner race 24 or coupled thereto in any conventional manner. The groove 58 is formed in the first end portion 66, 66A, 66B, 66C of the drive sleeve 30.

A stopper portion 74, 74A, 74B, 74C is attached to the drive sleeve 30. More specifically, the stopper portion 74, 74A, 74B, 74C is attached to the first end portion 66, 66A, 66B, 66C of the drive sleeve 30. Preferably, the stopper portion 74, 74A, 74B, 74C is formed from metal such as, for example, steel or plastic. However, the stopper portion may be formed of other rigid materials.

The stopper portion 74, 74A, 74B, 74C comprises an outer portion 76, 76B, 76C and an inner portion 78, 78B, 78C. The stopper portion 74 may also comprise a inner end portion 80. The outer portion 76, 76B, 76C and inner portion 78, 78B, 78C can be formed in unitary manner or as separate components. At least a portion of the stopper portion 74, 74A, 74B, 74C is disposed within the interior 82 of the constant velocity joint assembly 20, 20A, 20B, 20C, 20D. The stopper portion 74, 74A, 74B, 74C comprises a longitudinal axis which it shares with the longitudinal axis 38 of the constant velocity joint assembly 20, 20A, 20B, 20C, 20D. In certain embodiments like the ones shown in FIGS. 1 and 5, one or more of the outer portion 76, inner portion 78 and inner end portion 80 are aligned with the longitudinal axis 38 of the assembly 20, 20A.

Figure 6:
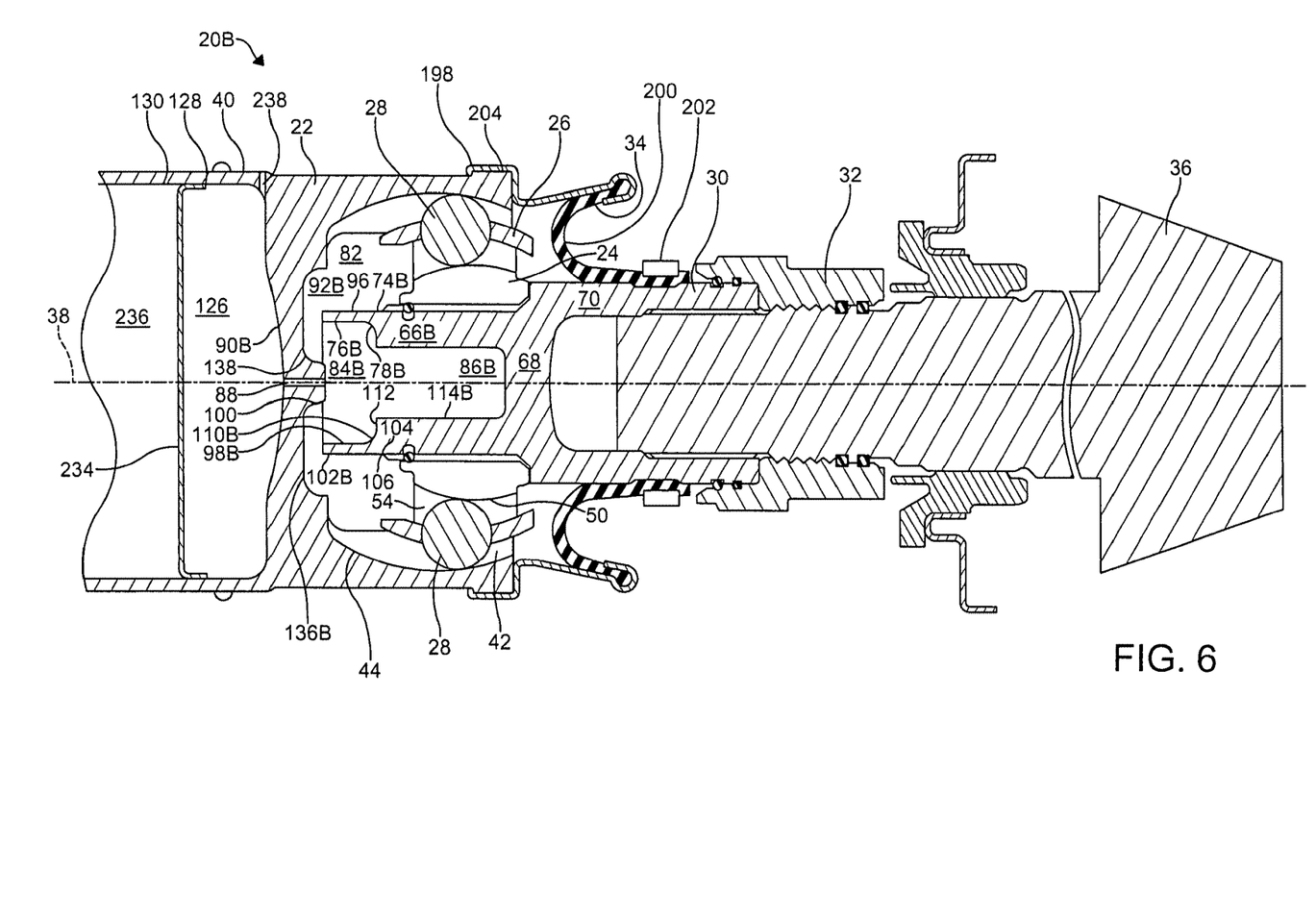
FIG. 6 is a cross-sectional view depicting another embodiment of the assembly in accordance with the invention.
Figure 7:
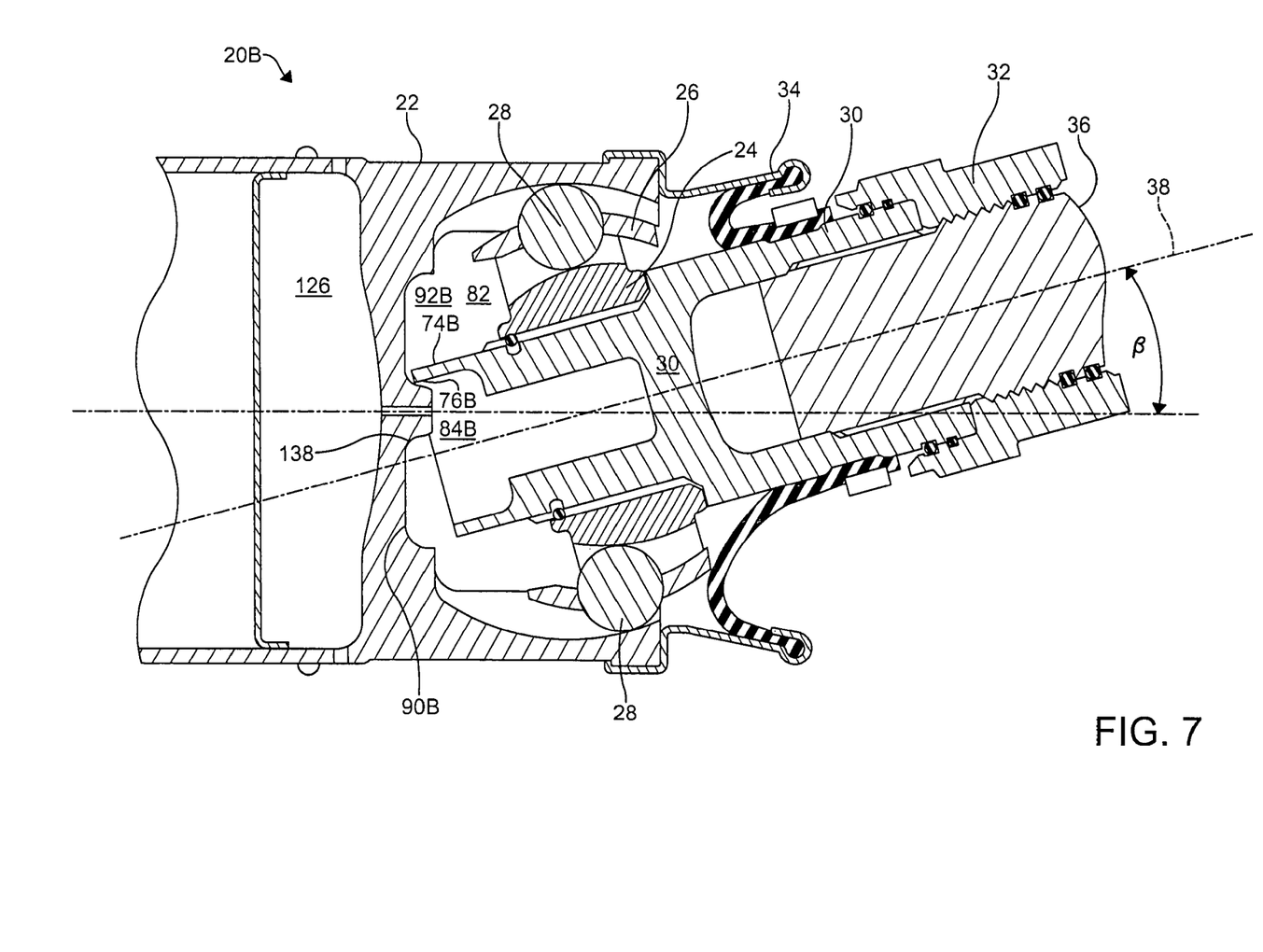
FIG. 7 is an enlarged view of a portion of the assembly of FIG. 6.
Figure 8:
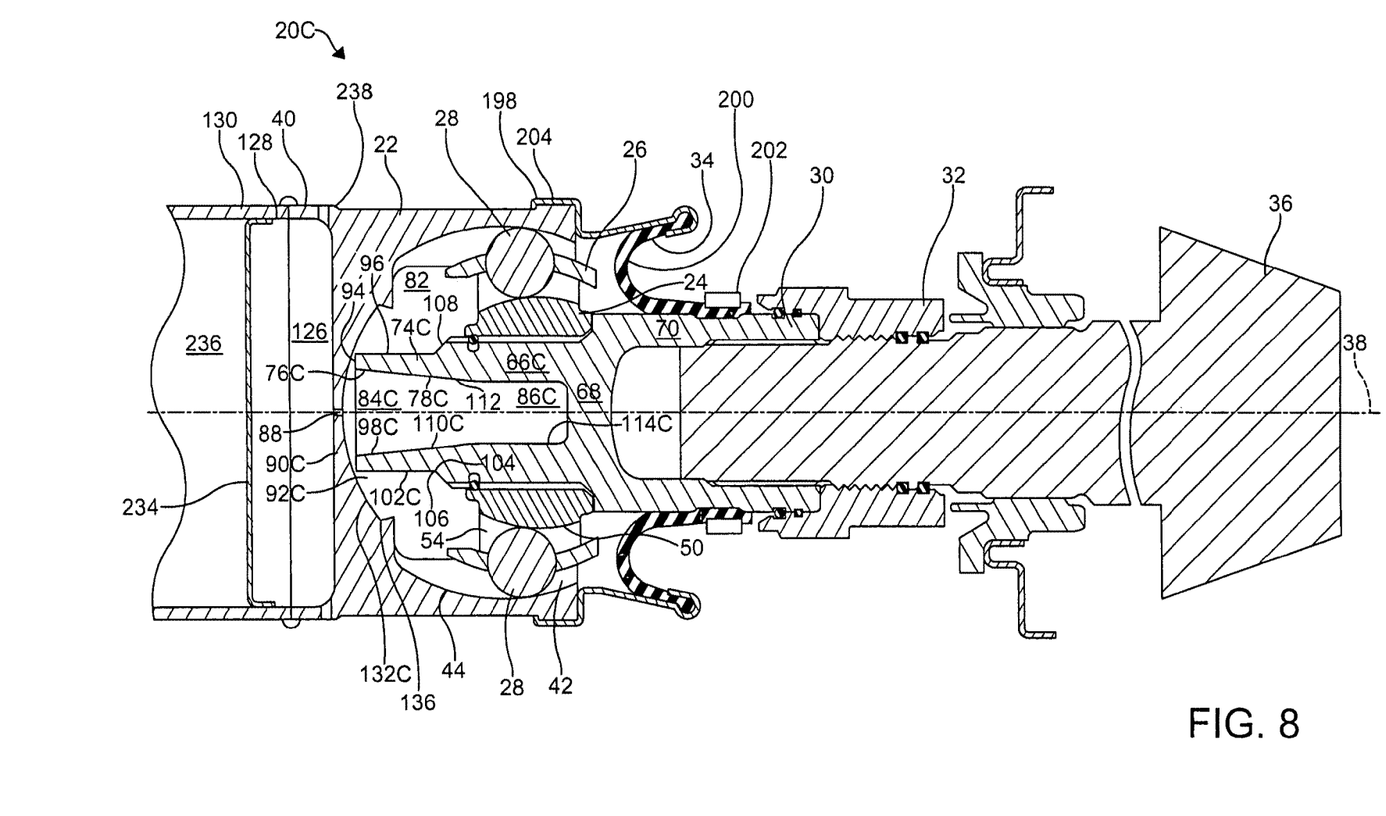
FIG. 8 is a cross-sectional view depicting another embodiment of the assembly in accordance with the invention.
Figure 9:
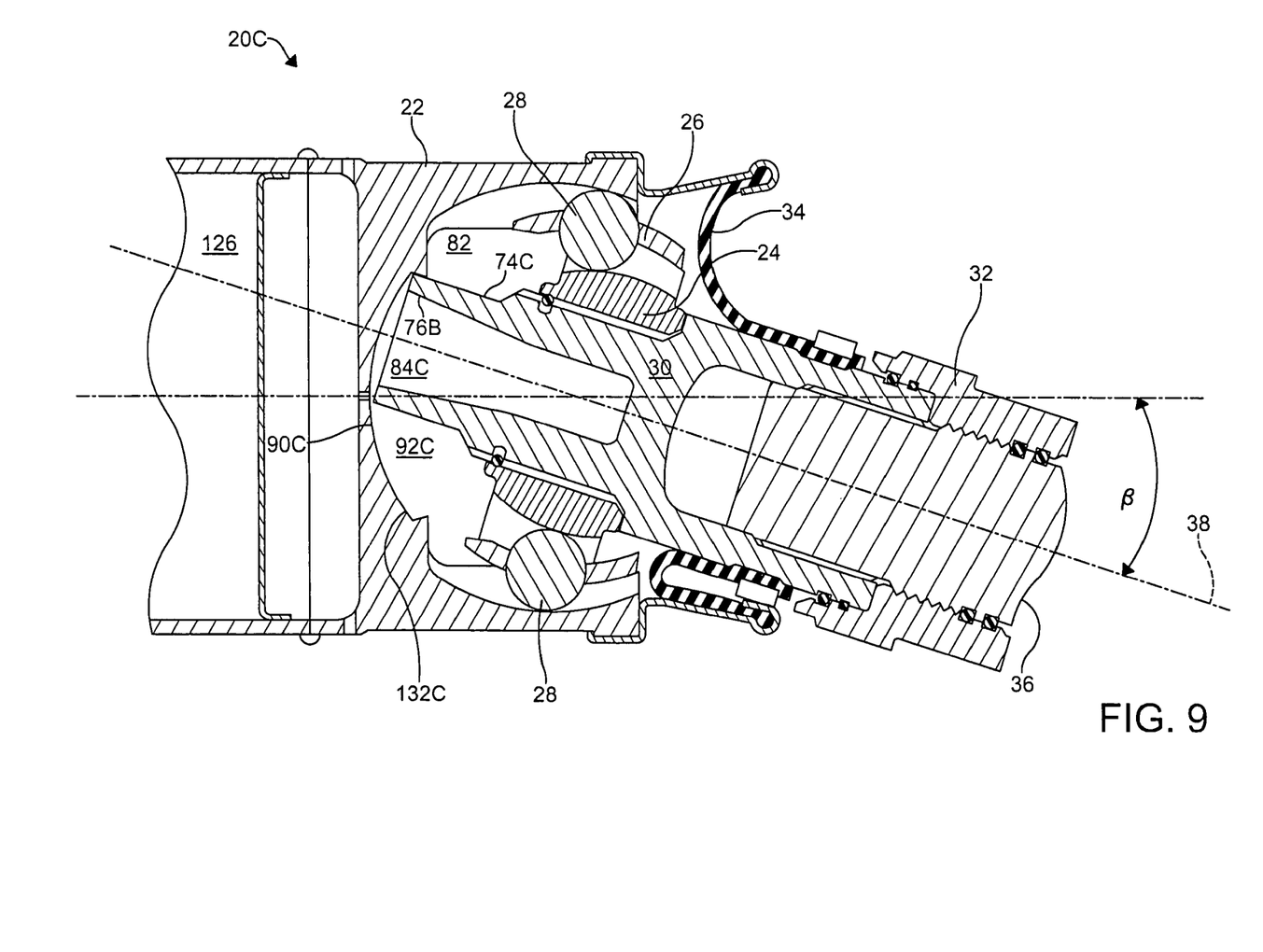
FIG. 9 is an enlarged view of a portion of the assembly of FIG. 8.
Figure 10:
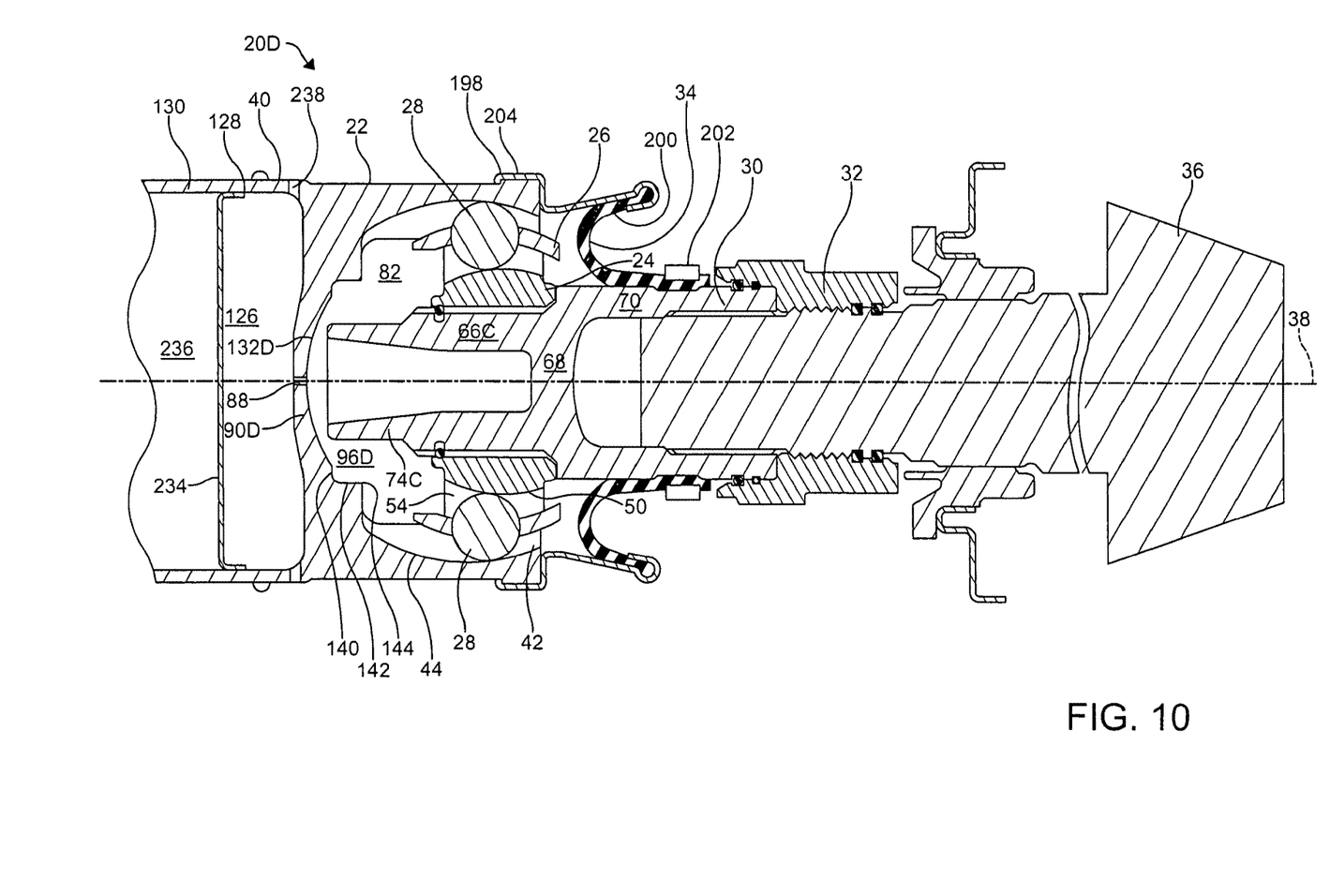
FIG. 10 is a cross-sectional view depicting another embodiment of the assembly in accordance with the invention.
Figure 11:
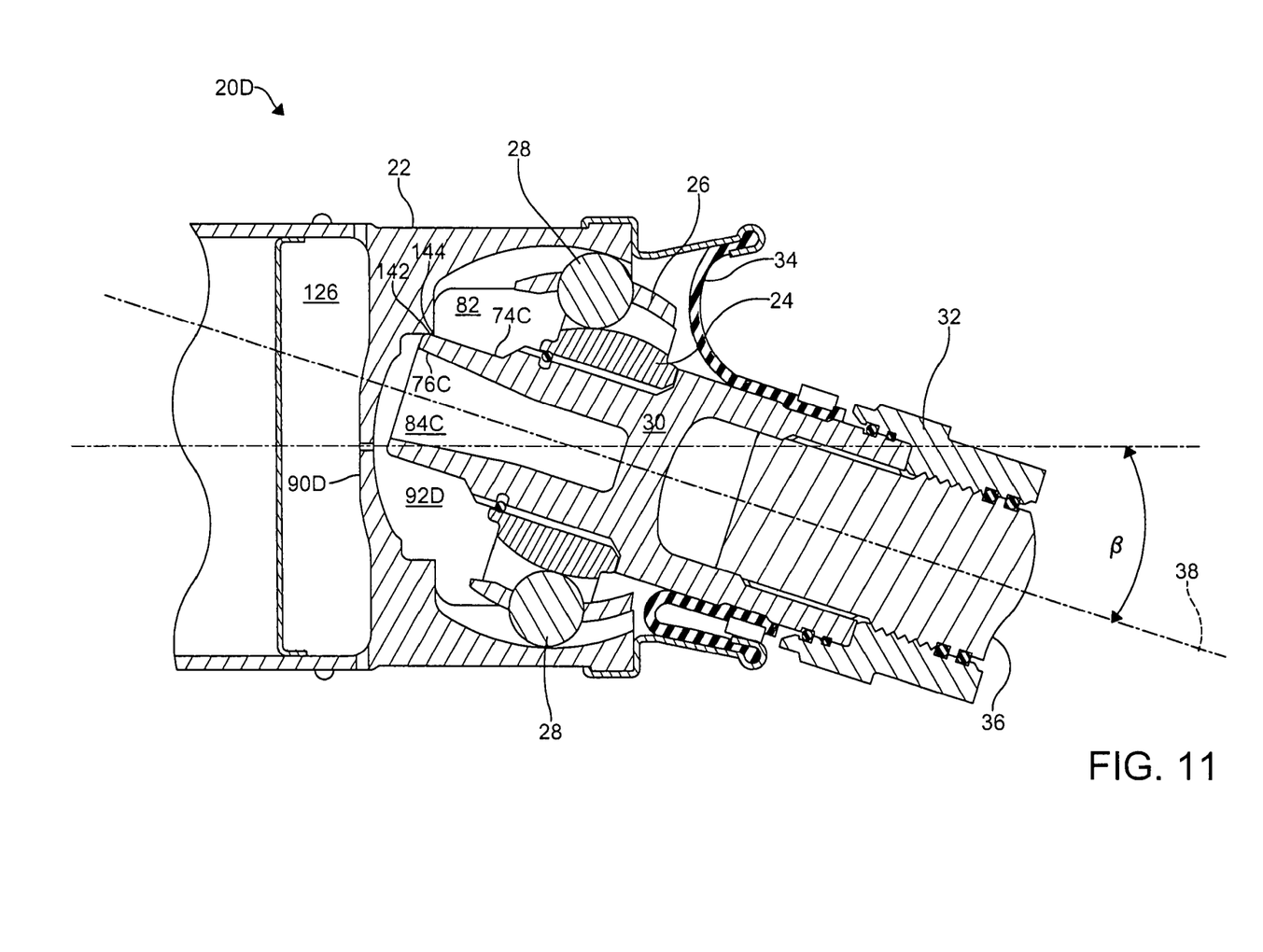
FIG. 11 is an enlarged view of a portion of the assembly of FIG. 10.

In other embodiments like the ones shown in FIGS. 6 and 8, the stopper portion 74B, 74C is of a generally annular shape such that outer portion 76B, 76C and inner portion 78B, 78C define a cavity 84B, 84C. The cavity 84B, 84C is in fluid communication with a drive sleeve cavity 86B, 86C formed in the first end portion 66B, 66C. The cavity 84B, 84C is in fluid communication with a first vent hole 88 provided through a wall portion 90B, 90C of the outer race 22. The cavity 84B, 84C is in fluid communication with first vent hole 88 via a space 92, 92B defined by the wall portion 90B, 90C.

In certain embodiments, the diameter of the cavity 84B, 84C gradually increases in length toward an outer end 94 of the stopper portion 74B, 74C. In one such embodiment like the one illustrated in FIG. 6, the cavity 84B is of a general disk shape. Moreover, it should be appreciated that the cavity 84B may be of another shape. For example, in another such embodiment like the one illustrated in FIG. 8, the cavity 84C is of a frustoconical shape. In this embodiment, the diameter of the cavity 84C gradually increases in length to the outer end 94 of the stopper portion 74C. Further, it should be appreciated that the cavity 84C may be of another conic shape.

In the embodiments illustrated in FIGS. 6 and 8, the drive sleeve cavity 86B, 86C is of a substantially cylindrical shape. However, it should be appreciated that the drive sleeve cavity may be of another shape. The cavity 84B, 84C is of a diameter which is greater than a diameter of the drive sleeve cavity 86B, 86C. In an embodiment like the one shown in FIG. 8, an outer portion of the diameter of the drive sleeve cavity 86C gradually increases to the cavity 84C of the stopper portion 74C.

The cavity 84B, 84C is formed through the outer portion 76B, 76C and the inner portion 78B, 78C of the stopper portion 74B, 74C. The outer portion 76, 76B, 76C may be of a generally cylindrical shape and has an outer diameter 96 which is of a length that is substantially constant. In an embodiment like the one shown in FIG. 6, the outer portion 76B comprises an inner diameter 98B which is of a length that is substantially constant. In other embodiments like the ones shown in FIGS. 8 and 10, the outer portion 76C comprises an inner diameter 98C which varies and gradually increases in length to and toward the outer end 94 of the stopper portion 74C. In these embodiments, the outer portion 76C gradually decreases in thickness toward the outer end thereof. The outer portion 76, 76B, 76C extends into the space 92, 92B, 92C, 92D defined by the wall portion 90, 90B, 90C, 90D of the outer race 22 and is positioned adjacent the wall portion 90, 90B, 90C, 90D. In the embodiment illustrated in FIG. 6, the cavity 84B receives a portion 100 of the wall portion 90B.

The inner portion 78, 78B, 78C is attached to the outer portion 76, 76B, 76C and separates the outer portion 76, 76B, 76C from the first end portion 66, 66A, 66B, 66C. In certain embodiments like those shown in FIGS. 1 and 5, an outer diameter 102 of the inner portion 78 gradually increases in length to an inner end 104 toward the first end portion 66 of the drive sleeve 30. In these embodiments, the inner portion 78 gradually decreases in thickness toward the outer portion 76 and outer end thereof and gradually increases in thickness to the drive sleeve 30. Also, in these embodiments, the inner portion 78 is preferably of a frustoconical shape and the inner end 104 of the stopper portion 74, 74A abuts a first end 74 of the first end portion 66, 66A. As best shown in FIG. 8, a ramped transition 108 of the first end portion 66C may connect the first end 106 to the splined portion of the first end portion 66C. In other embodiments like those shown in FIGS. 6 and 8, the outer diameter 102B, 102C of the inner portion 78B, 78C is substantially constant to the inner end 104 toward the first end portion 66 of the drive sleeve 30. In still other embodiments like the ones shown in FIGS. 6 and 8, an inner diameter 110B, 110C of the inner portion 78B, 78C gradually decreases in length to an end 112 of the inner portion 78B, 78C toward the first end portion 66B, 66C. In these embodiments, the inner diameter 110B, 110C of the inner portion 78B, 78C gradually increases in length toward the outer portion 76, 76C. Thus, the inner portion 78B, 78C gradually decreases in thickness toward the outer portion 76, 76C and outer end thereof and gradually increases in thickness to the drive sleeve 30

Figures 2, 2A, 3, 3A:
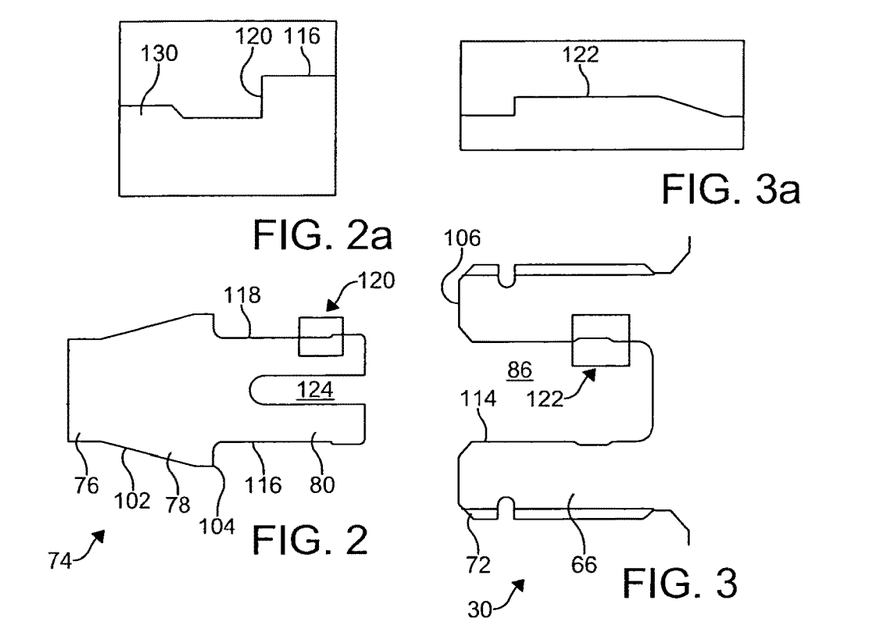
FIG. 2 is a side view of a stopper portion of the assembly of FIG. 1.
FIG. 2A is an enlarged view of a portion of the stopper portion of FIG. 2.
FIG. 3 is a side view of a first end portion of a drive sleeve of the assembly of FIG. 1.
FIG. 3A is a side view of a portion of the first end portion of FIG. 3.
Figure 4:
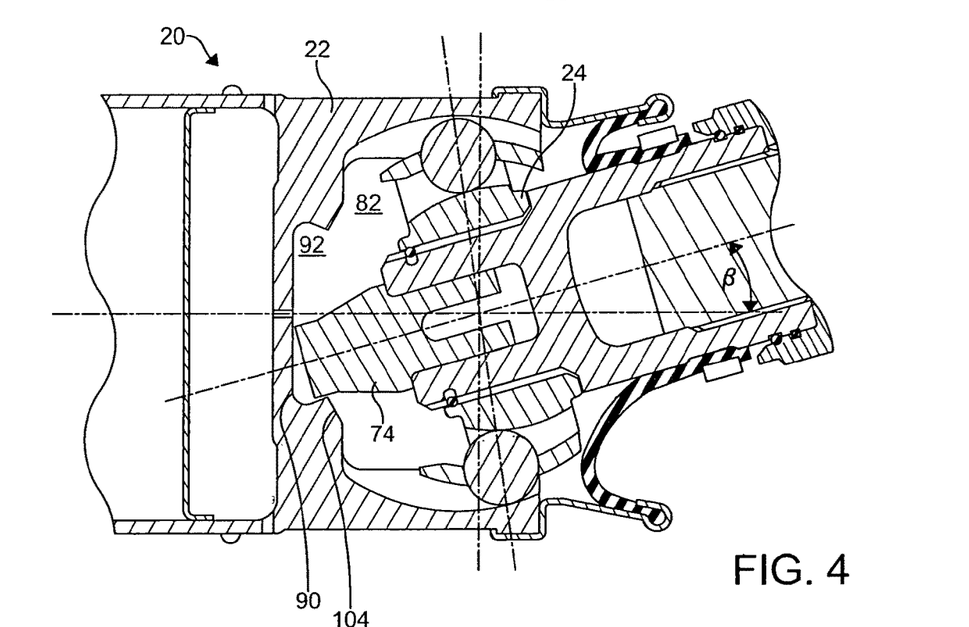
FIG. 4 is a view of a portion of the assembly of FIG. 1.

Referring back to FIG. 1, in an embodiment, the inner end portion 80 is attached to the inner portion 78. The inner end portion 80 is received in a drive sleeve cavity 86 for attachment to the first end portion 66. In embodiments like those illustrated in FIGS. 6 and 8 where the stopper portion 74B, 74C does not include the inner end portion 80, the drive sleeve cavity 86B, 86C is still formed in the first end portion 66B, 66C of the drive sleeve 30. As shown in FIGS. 3, 6, and 8, the drive sleeve cavity 86, 86B, 86C is defined by an inner surface 114, 114B, 114C of the first end portion 66, 66B, 66C.

The inner end portion 80 comprises an outer surface 116 which is of an outer diameter 118. The outer surface 116 of the inner end portion 80 faces the inner surface 114 of the first end portion 66. As best shown in FIGS. 2 and 2A, a mating portion 120 is provided on the outer surface 116 of the inner end portion 80. Also, as shown best in FIGS. 3 and 3A, the inner surface 114 of the first end portion 66 includes an annular groove 122. The annular groove 122 is located near an end of the inner surface 114.

Referring back to FIG. 2, an aperture 124 is formed in the inner end portion 80. The aperture 124 allows the stopper portion 74 to be attached to the drive sleeve 30 via a press fit The inner end portion aperture 124 is aligned with the drive sleeve cavity 86 formed in the first end portion 66. Forming the inner end portion aperture 124 allows a length of the outer surface outer diameter 118 to be reduced when the constant velocity joint assembly 10 is being assembled. When the mating portion 120 slides into the annular groove 122, the length of the outer diameter is restored so that the mating portion 120 is attached to the annular groove 122 in an interlocked manner and the stopper portion 74 is attached to the drive sleeve 30 as is shown in FIG. 1.

Figure 5:
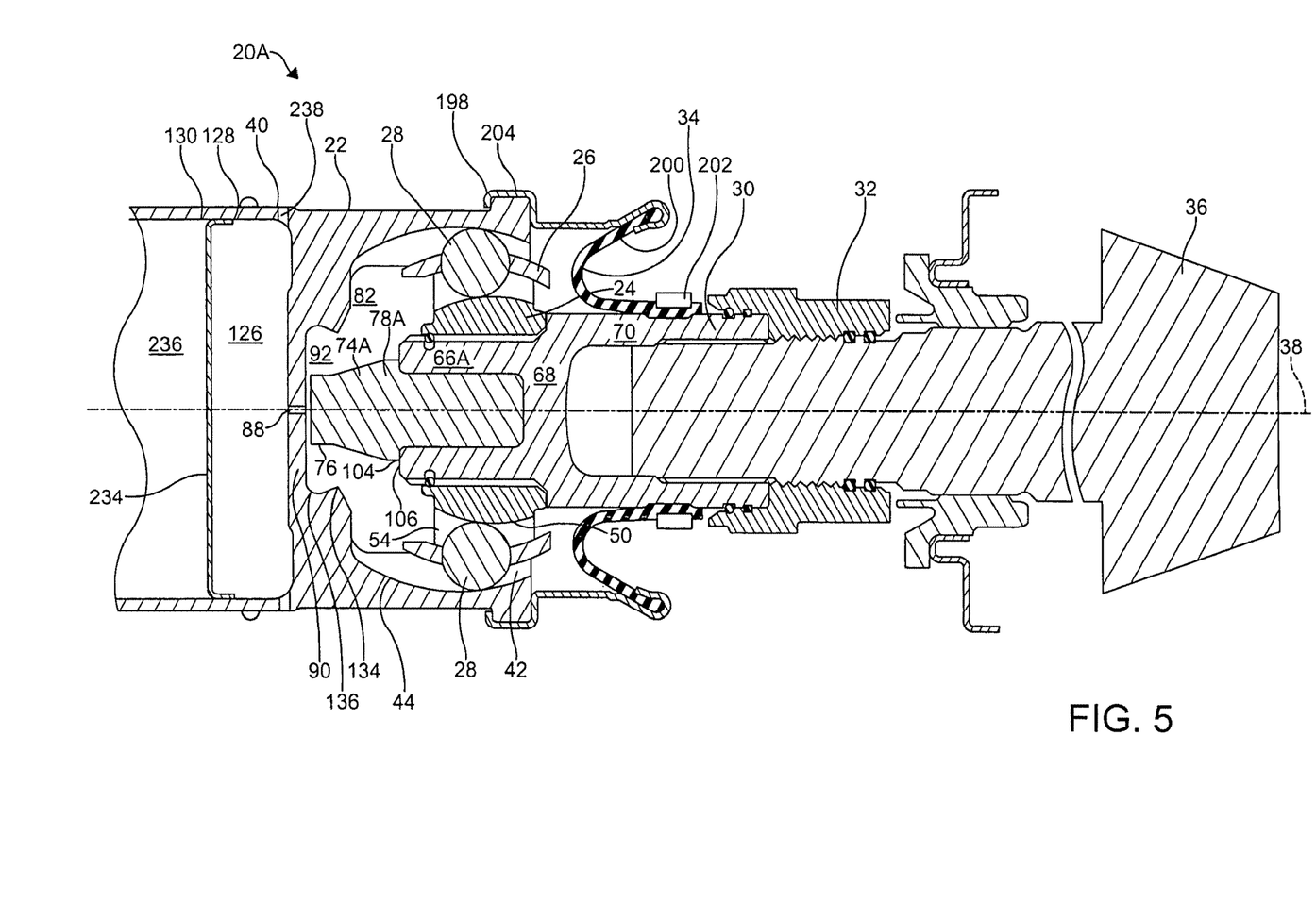
FIG. 5 is a cross-sectional view depicting another embodiment of the assembly in accordance with the invention.

In other embodiments such as the ones illustrated in FIGS. 5, 6, and 8, the stopper portion 74A, 74B, 74C is formed in a unitary manner with the drive sleeve 30. In these embodiments, the stopper portion 74A, 74B, 74C is provided at the first end 106 of the first end portion 66A, 66B, 66C so that the inner portion 78, 78B, 78C is attached to the outer portion 76, 76B, 76C on an end and the first end portion 66A, 66B, 66C on an opposite end.

As mentioned above, the wall portion 90, 90B, 90C, 90D defines the space 92, 92B, 92C, 92D. The space 92, 92B, 92C, 92D is in fluid communication with the interior 82 of the constant velocity joint assembly 20, 20A, 20B, 20C, 20D and an area 126 partially defined by an inner diameter 128 of a shaft 130 via the first vent hole 88. In certain embodiments, the space 92, 92C, 92D may be of a general disk shape. However, as illustrated, the space may comprise additional shaped portions. In certain embodiments, the space 92C, 92D may be at least partially defined by an inner surface 132C, 132D of the wall portion 90C, 90D that is curvilinear. In other embodiments like the one illustrated in FIG. 1, the wall portion 90 comprises a chamfered portion 134. In this embodiment and the embodiment illustrated in FIG. 8, the space 92, 92D generally decreases in width from an end portion 136 toward the first end portion 66, 66C of the drive sleeve 30. In still other embodiments like the one illustrated in FIG. 6, the space 92B is generally of an annular shape. In these embodiments, the wall portion 90B comprises the filet portion 138 and the space 92B generally increases in width from an end portion 136B toward the first end portion 66B of the drive sleeve 30. In still further embodiments like the one illustrated in FIG. 10, the wall portion 90D comprises a rounded portion 140 attached to an inboard extending portion 142. In this embodiment, the inboard extending portion 142 has an end 144 that is sharply defined.

As illustrated in FIGS. 4, 7, 9 and 11, when the constant velocity joint assembly 20, 20A, 20B, 20C, 20D is at a maximum articulation angle β, the outer portion 76, 76B, 76C of the stopper portion 74, 74A, 74B, 74C abuts the wall portion 90, 90B, 90C, 90D. When the outer portion 76, 76B, 76C abuts the wall portion 90, 90A, 90B, 90C, 90D as illustrated in FIGS. 4, 7, 9 and 11, the constant velocity joint assembly 20, 20A, 20B, 20C, 20D is limited to the maximum articulation angle β. In an embodiment like the one shown in FIG. 4, when the constant velocity joint assembly 20 is at a maximum articulation angle β, the outer portion 76 abuts the chamfered portion 134 of the wall portion 90. In another embodiment like the one shown in FIG. 7, when the constant velocity joint assembly 20B is at the maximum articulation angle β, the outer portion 76B abuts the filet portion 138. In still another embodiment like the one shown in FIG. 11, when the constant velocity joint assembly 20D is at the maximum articulation angle β, the outer portion 76C abuts the inboard extending portion 142 and the end 144 thereof. Limiting the constant velocity joint assembly 20, 20A, 20B, 20C, 20D to the maximum articulation angle β prevents damage to the boot assembly 34 which may occur when the constant velocity joint assembly 20, 20A, 20B, 20C, 20D exceeds the maximum articulation angle β.

Referring back to FIG. 1, the middle portion 68 is a substantially disk shaped portion of the drive sleeve 30 located between the first end portion 66, 66A, 66B, 66C and the second end portion 70. The middle portion 68 has an outer diameter greater than an outer diameter of the first end portion 66, 66A, 66B, 66C. The middle portion 68 defines a sleeve seat 146 of the drive sleeve 30. The sleeve seat 146 in the depicted embodiment has an angled portion 148 connected to a radial portion 150 that extends vertically. When the first sleeve seat 146 is disposed against a portion of the inner race 24 with a complementary shape.

The second end portion 70 is hollow and it is formed opposite the first end portion 66, 66A, 66B, 66C. The second end portion 70 comprises a first inner diameter portion 152 and a second inner diameter portion 154. The first inner diameter portion 152 has a small diameter than the second inner diameter portion 154. A ramped transition 156 connects the two diameter portions 152, 154.

The second end portion 70 also comprises a plurality of inner splines 158 in the first inner diameter portion 152, a boot groove 160, a first O-ring groove 162 and a first snap ring groove 164. A first O-ring 166 is located in the first O-ring groove 162 and a first snap ring 168 is located in the first snap ring groove 164. The grooves 162, 164 and rings 166, 168 are located on an outer surface 170 of the second end portion 70. The second end portion 70 is sealingly engaged with a portion of the boot assembly 34.

The plurality of inner splines 158 is formed on the first inner diameter portion 152 of the second end portion 70 for drivingly engaging the plug-in pinion shaft 36. Alternatively, the second end portion 70 may be coupled to the plug-in pinion shaft 36 in any manner that permits sliding engagement.

The first snap ring 168 engages a snap ring groove 172 on a first inside surface 174 of the drive nut 32. The first snap ring 168 axially secures the drive nut 32 and the drive sleeve 30. Alternatively, it is understood that the second end portion 70 may be configured to be engaged with the drive nut 32 in any conventional manner. The O-ring 166 tightly seals the interface between the drive nut 32 and the drive sleeve 30.

The boot groove 160 is an annular recess defined by the outer surface 170 of the second end portion 70. The boot groove 160 is formed intermediate the grooves 162, 164 and the middle portion 68. The boot groove 160 receives a portion of, and is sealingly engaged with, the boot assembly 34. Alternatively, it is understood that the second end portion 70 may be configured with another feature which receives and sealingly engages the boot assembly 34.

The drive nut 32 is a hollow annular member formed from a rigid material such as steel. It is understood that the drive nut 32 may be formed using any conventional process from any rigid material.

The drive nut 32 comprises a first portion 176 and a second portion 178. The portions 176, 178 are unitary and integrally formed. The first portion 176 radially overlaps a part of the drive sleeve second end portion 70. The first portion 176 has the snap ring groove 172. The first portion 176 has a larger inner diameter portion 180 than an inner diameter portion 182 of the second portion 140.

The first portion 176 has a first chamfered surface 184 proximate the snap ring groove 172 to facilitate compression of the snap ring 168 during assembly.

The inner diameter 182 of the second portion 178 has a plurality of threads 186 thereon. The drive nut threads 186 engage with a complementary set of threads on the shaft 36.

The inner diameter 182 also defines a second snap ring groove 188. The shaft 36 has a complementary snap ring groove 190. A snap ring 192 is located in grooves 188, 190 to axially secure the nut 20 and shaft 36 together. The shaft 36 also has an O-ring groove 194 in which an O-ring 196 is located. The O-ring 196 seals the interface between the shaft 36 and the nut 20.

The snap ring groove 188 has a chamfered edge to facilitate remove of the nut 20, such as for repair or replacement.

The boot assembly 34 comprises a boot retainer 198, boot 200 and boot band assembly 202. As shown in FIG. 1, the boot assembly 34 is disposed on the outer race 22 and is in sealing engagement with the drive sleeve 30. The boot 200 is coupled to the boot retainer 198 by a crimped portion of the boot retainer 198. The boot 200 is sealingly engaged with the drive sleeve 30 using the boot band assembly 202. The boot band assembly 202 is preferably a clamping device. It should be understood that other types of clamping devices may be used with the constant velocity joint assembly 20, 20A, 20B, 20C, 20D to sealingly engage the boot 200 with the drive sleeve 30.

The boot retainer 198 is an annular member formed from a rigid material, such as a metal or a plastic. The boot retainer 198 is coupled to and is sealingly engaged with the outer race 22. A first end portion 204 of the boot retainer 198 engages a shoulder 206 defined by an outer surface 208 of the outer race 22. However, it should be appreciated that the boot retainer 198 may be coupled to the outer race 22 in other manners. A sealing member 210 such as, for example, an O-ring may be positioned between the boot retainer 198 and the shoulder 206 in a groove 212 formed in the outer surface 208 of the outer race 22 to provide a seal between the boot retainer 198 and the outer race 22. A second end portion 214 has a substantially U-shaped cross-section which encloses a portion of the boot 200 to couple the boot 200 to the boot retainer 198. Alternately, the second end portion 214 may have other shapes that facilitate coupling the boot 200 to the boot retainer 198.

The boot 200 is an annular member having a substantially U-shaped cross-section formed from a resilient material, such as an elastomer. The boot 200 facilitates movement between the outer race 22 and the drive sleeve 30 while sealing engagement is maintained therebetween. A first end portion 216 of the boot 200 is coupled to the boot retainer 198 as described hereinabove. A second end portion 218 of the boot 200 is sealingly engaged with and coupled to the boot groove 160 of the drive sleeve 30 as described hereinabove.

The plug-in pinion shaft 36 is an elongate member which is drivingly engaged with the drive sleeve 30 when the constant velocity joint assembly 20, 20A, 20B, 20C, 20D is assembled. The plug-in pinion shaft 36 is formed from a rigid material such as steel using any conventional process. The plug-in pinion shaft 36 comprises a first end portion 220, a middle portion 222, and a second end portion 224.

The first end portion 220 of the plug-in pinion shaft 36 is a cylindrical shaped portion formed opposite the second end portion 224. The first end portion 220 comprises a plurality of outer splines 226 corresponding to the inner splines 158 of the drive sleeve 30. When the constant velocity joint assembly 20, 20A, 20B, 20C, 20D is assembled, the plug-in pinion shaft 36 is drivingly engaged with the drive sleeve 30 through the splines 158, 226 so that the two rotate together as one. The plurality of outer splines 226 is formed on an outer surface 228 of the plug-in pinion shaft 36. Alternately, it is understood that the plug-in pinion shaft 36 may be drivingly engaged with the plug-in pinion shaft 36 in any manner that permits sliding engagement.

The middle portion 222 is a cylindrical shaped portion of the plug-in pinion shaft 36 formed between the first end portion 220 and the second end portion 224. The middle portion 222 has a larger diameter than the first end portion 220. The two portions 220, 222 are separated by a ramped transition portion 230. The snap ring and O-ring grooves 190, 194 are located in middle portion 222. The middle portion 222 also comprises a set of threads 232 for engaging with the nut threads 186. The threads 186, 232 secure the shaft 36 and the nut 19 so that the two rotate together.

The second end portion 224 is configured to be drivingly engaged with a drive component (not shown). The second end portion 224 may have a beveled pinion gear for engagement with the drive component. However, it should be appreciated that the second end portion 224 may be configured in any manner that permits driving engagement between the plug-in pinion shaft 36 and the drive component.

Grease or another suitable lubricant is disposed within the interior 82 of the constant velocity joint assembly 20, 20A, 20B, 20C, 20D to lubricate the torque transfer elements 28 and thus improve their slidability and increase the useful life of the constant velocity joint assembly 20, 20A, 20B, 20C, 20D. When the constant velocity joint 20, 20A, 20B, 20C, 20D is spinning at high speeds, pressure is created in the interior 82. Pressure is vented from the interior 82 via the first vent hole 88.

The first vent hole 88 is provided through the outer race 22. More particularly, the first vent hole 88 is provided through and located in the wall portion 90, 90B, 90C, 90D of the outer race 22 along the longitudinal axis 38 of the assembly 20, 20A, 20B, 20C, 20D. In an embodiment, the first vent hole 88 is provided through the filet portion 138. The first vent hole 88 provides fluid communication between the space 92, 92B, 92C, 92D defined by the wall portion 90, 90B, 90C, 90D and the area 126 partially defined by the inner diameter 128 of the shaft 130. FIG. 1 depicts a single first vent hole 88 aligned with the longitudinal axis 38 of the assembly 10. However, additional vent holes in the wall portion 90, 90B, 90C, 90D are permissible.

When the constant velocity joint assembly 20, 20A, 20B, 20C, 20D is spinning, the outer portion 76, 76B, 76C of the stopper portion 74, 74A, 74B, 74C moves within the space 92, 92B, 92C, 92D. Movement of the stopper portion 74, 74A, 74B, 74C within the space 92, 92B, 92C, 92D helps to vent the interior 82 of the constant velocity joint assembly 20, 20A, 20B, 20C, 20D by creating air circulation in the space 92, 92B, 92C, 92D and through the first vent hole 88. Air circulation through the first vent hole 88 also enhances the venting of the interior 82 of the constant velocity joint assembly 20, 20A, 20B, 20C, 20D by helping to prevent blockages in and around the first vent hole 88 from forming.

The attachment end 40 of the outer race 22 is drivingly engaged with the shaft 130. The engagement is typically via welding, but other attachment methods may also be used.

The shaft 130 comprises the area 126 which is defined by the outer race 22, inner diameter 128 of the shaft 130 and a plug 234. Preferably, the inner diameter 128 of the shaft 130 is of a length which is substantially constant. The plug 234 is solid without any gaps or breaks. The plug 234 is located in a space 236 and extends continuously across to seal against the inner diameter 128 in an airtight manner and define the area 126.

The area 126 is in fluid communication with a second vent hole 238. The second vent hole 238 is also in fluid communication with the atmosphere. The pressure created in the interior 82 of the constant velocity joint is vented to the atmosphere via the second vent hole 238. Thus, fluid communication is provided between the interior 66 of the joint assembly, space 92, 92B, 92C, 92D, first vent hole 88, area 126, second vent hole 238 and atmosphere to vent pressure thereto.

The second vent hole 238 is provided in the attachment end 40 of the outer race 22. While one second vent hole 238 is depicted in the FIG. 1 additional vent holes may be used. The additional vent holes may be circumferentially spaced about the attachment end 40 or any spacing may be arranged between them. The second vent hole 238 may be fitted with a check valve or other covering (neither being shown in the figures) in order to prevent dirt, debris or moisture from entering the joint 10 and/or clogging the vent holes 88, 238.

In accordance with the provisions of the patent statutes, the present invention has been described in what is considered to represent its preferred embodiments. However, it should be noted that the invention can be practiced otherwise than as specifically illustrated and described without departing from its spirit or scope.

What we claim is:

1. A constant velocity joint assembly, comprising:
   an outer race having a plurality of outer tracks formed in an inner surface thereof;
   an inner race having a plurality of inner tracks formed in an outer surface thereof;
   a cage disposed between the inner race and the outer race;
   a plurality of torque transferring elements disposed in the cage, each torque transferring element contacting one of the outer tracks of the plurality of outer tracks and one of the inner tracks of the plurality of inner tracks;
   a drive sleeve comprised of a first end portion, a second end portion and a middle portion, wherein said first end portion is splinely engaged with said inner race, said middle portion is disposed against said inner race wherein said middle portion has an outer diameter larger than an outer diameter of said first end portion, wherein said second end portion is hollow and receives a shaft therein, wherein a drive nut overlaps a portion of said second end portion and connects therewith and said drive nut connects with said shaft; and
   a stopper portion attached to the drive sleeve, the stopper portion comprising a portion that reduces in thickness toward an outer end thereof, wherein the stopper portion defines a cavity.

2. The constant velocity joint assembly of claim 1, wherein the portion of the stopper portion gradually reduces in thickness.

3. The constant velocity joint assembly of claim 1, wherein the stopper portion comprises an outer portion which has an outer diameter that is substantially constant.

4. The constant velocity joint assembly of claim 1, wherein the stopper portion is attached to an end of the drive sleeve and is formed in a unitary manner therewith.

5. The constant velocity joint assembly of claim 1, wherein the stopper portion shares a longitudinal axis with the constant velocity joint assembly and has an outer portion of a generally cylindrical shape that extends into a space defined by the outer race.

6. The constant velocity joint assembly of claim 1, wherein the outer race further comprises a wall potion having a vent hole provided therethrough, the vent hole being in fluid communication with a space defined by the wall portion and aligned with a longitudinal axis of the constant velocity joint assembly.

7. The constant velocity joint assembly of claim 1, wherein first end portion has a drive sleeve cavity formed therein which is of a substantially cylindrical shape.

8. The constant velocity joint assembly of claim 1, wherein the stopper portion comprises an outer portion which abuts a wall portion of the outer race to limit the maximum articulation angle of the constant velocity joint assembly.

9. The constant velocity joint assembly of claim 1, wherein the stopper portion comprises a portion that gradually increases in thickness to the drive sleeve.

10. The constant velocity joint assembly of claim 1, wherein the cavity is of a diameter which gradually increases toward the outer end.

11. The constant velocity joint assembly of claim 1, wherein the cavity is in fluid communication with a vent hole provided through a wall portion of the outer race.

12. The constant velocity joint assembly of claim 1, wherein the cavity is formed through an inner portion and an outer portion of the stopper portion.

13. The constant velocity joint assembly of claim 1, wherein the cavity is in fluid communication with a drive sleeve cavity.

14. A constant velocity joint assembly, comprising:
    an outer race having a plurality of outer tracks formed in an inner surface thereof;
    an inner race having a plurality of inner tracks formed in an outer surface thereof;
    a cage disposed between the inner race and the outer race;
    a plurality of torque transferring elements disposed in the cage, each torque transferring element contacting one of the outer tracks of the plurality of outer tracks and one of the inner tracks of the plurality of inner tracks;
    a drive sleeve comprised of a first end portion, a second end portion and a middle portion, wherein said first end portion is splinely engaged with said inner race, said middle portion is disposed against said inner race wherein said middle portion has an outer diameter larger than an outer diameter of said first end portion, wherein said second end portion is hollow and receives a shaft therein, wherein a drive nut overlaps a portion of said second end portion and connects therewith and said drive nut connects with said shaft; and
    a stopper portion attached to the drive sleeve, the stopper portion having a portion that gradually reduces in thickness toward an outer end thereof and an outer portion that comprises an outer diameter which is substantially constant and extends into a space defined by the outer race.

15. The constant velocity joint assembly of claim 14, wherein the space defined by the outer race is in fluid communication with a vent hole provided through a wall portion of the outer race and the stopper portion abuts the wall portion to limit the maximum articulation angle of the constant velocity joint assembly.

16. A constant velocity joint assembly, comprising:
    an outer race having a plurality of outer tracks formed in an inner surface thereof;
    an inner race, having a plurality of inner tracks formed in an outer surface thereof;
    a cage disposed between the inner race and the outer race;
    a plurality of torque transferring elements disposed in the cage, each torque transferring element contacting one of the outer tracks of the plurality of outer tracks and one of the inner tracks of the plurality of inner tracks;
    a drive sleeve comprised of a first end portion, a second end portion and a middle portion, wherein said first end portion is splinely engaged with said inner race, said middle portion is disposed against said inner race wherein said middle portion has an outer diameter larger than an outer diameter of said first end portion, wherein said second end portion is hollow and receives a shaft therein, wherein a drive nut overlaps a portion of said second end portion and connects therewith and said drive nut connects with said shaft via threads on an inner surface of the drive nut and threads on an outer surface of the shaft; and a stopper portion attached to the drive sleeve, the stopper portion comprising a portion that reduces in thickness toward an outer end thereof.

\* \* \* \* \*